May 15, 1945.　　W. L. McNAMARA ET AL　　2,375,936
LEER LOADER
Original Filed Oct. 31, 1942　　2 Sheets-Sheet 2

INVENTORS
William L. McNamara.
Frederick Z. Fouse.
BY Corbett, Mahoney & Miller
ATTORNEYS Patented May 15, 1945

2,375,936

UNITED STATES PATENT OFFICE 2,375,936

LEHR LOADER

William L. McNamara and Frederick Z. Fouse, Lancaster, Ohio, assignors to Anchor Hocking Glass Corporation, Lancaster, Ohio, a corporation of Delaware Original application October 31, 1942, Serial No. 464,048, now Patent No. 2,363,681, dated November 28, 1944. Divided and this application April 29, 1944, Serial No. 533,329

2 Claims. (Cl. 198—24)

Our invention relates to a lehr loader. It has to do, more particularly, with apparatus or means for receiving glassware from a glass-forming machine and transferring it to an annealing lehr, the apparatus serving to arrange the glassware in the lehr in such a manner that a maximum amount of the ware can be handled by the lehr. The present application is a division of our co-pending application Serial No. 464,048 filed October 31, 1942, and issued November 28, 1944, as Patent No. 2,363,681.

At the present time, it is customary to transfer formed glassware from the forming machine onto a continuously moving conveyer where the ware is disposed in a single file. This continuously moving conveyer usually transfers the ware to some type of lehr-loading apparatus. Many types of lehr loaders are employed at present.

One type commonly employed is known as the pusher bar type. Another type is known as the plow type. Both of these types of lehr loaders receive the ware from the continuously moving conveyer, assemble it in rows transversely of the front of the lehr and then push the articles onto the lehr conveyer. With this type of apparatus, there must be a sufficient period elapse between the removal of the ware from the forming machine and the pushing of the ware into the lehr, in order to permit the ware to set sufficiently so that its shape will not be injured by the pushing or plowing action. Furthermore, even if the ware is set sufficiently to prevent distortion thereof, the ware is subjected to considerable stress by this type of apparatus.

Another type of lehr loader employed is that type known as the gripping tong type. This type is commonly employed in connection with bottles and grips the bottles by their necks, while they are supported on the forming machine conveyer, lifts them and deposits them on the lehr conveyer. This type of apparatus may be of such a nature that it will lift individual bottles or rows of bottles. Such apparatus can be used for certain types of ware only. It is usually designed for a specific shape, height and width of ware. Furthermore, many times the tongs fail to grip the articles securely and, consequently, they drop from the tongs. Also, in gripping the articles they may damage them.

Another type of lehr loader employed at the present time is that type known as the vacuum chuck type. This type includes vacuum chucks which serve to pick up the articles from the forming machine conveyer and deposit them on the lehr conveyer. With this type of apparatus, it sometimes happens that the vacuum fails to hold the article, due to various causes, and will drop the article. This type of apparatus may be of such a nature that it will lift individual articles or rows of articles. It is usually designed for handling one particular type of ware.

All of the various types of lehr loaders mentioned above are of a comparatively complicated structure. They are of such a nature that considerable mechanism is involved in their operation. Furthermore, each of these types of lehr-loading apparatus requires timing mechanism which is usually complicated, sensitive, and requires accurate adjustment. Because of the complicated nature of these lehr loaders, the initial cost of building such apparatus is very high. Furthermore, the cost of operation and the cost of upkeep of these various forms of apparatus is likewise high.

Moreover, all of these lehr loaders have usually been of such a type that the most efficient arrangement of the glass articles on the lehr conveyer was not accomplished. This increased the cost of operation of the lehr and, consequently, the cost of the glass articles treated in the lehr.

One of the objects of our invention is to provide a lehr-loading apparatus of such a nature that the glass articles received thereby will be arranged on the lehr conveyer in the most efficient manner.

Another object of our invention is to provide a lehr loader or transfer mechanism which is of relatively simple construction, having a minimum amount of mechanism, and one which can be built initially at a minimum cost, and wherein the operation and upkeep costs will be reduced to a minimum.

Another object of our invention is to provide lehr-loading apparatus of the class described which will handle various types of ware without regard to its height, diameter, taper or other contour characteristics.

Another object of our invention is to provide lehr-loading apparatus of the type indicated which is of such a nature that it can handle articles of various shapes and sizes at the same time.

Another object of our invention is to provide lehr-loading apparatus which is of such a nature that it can handle a plurality of different types of ware received from the forming machine and will separate the different types of ware into different groups.

Another object of our invention is to provide lehr-loading apparatus which is of such a nature that distortion of the ware will not occur even though the ware has not completely set.

Another object of our invention is to provide lehr-loading apparatus which is of such a nature that the glassware will not be subjected to undue stress.

Another object of our invention is to provide a lehr-loading apparatus of such a nature that the danger of dropping of articles will be eliminated.

A further object of our invention is to provide an improved lehr loader having improved means or mechanism which is power driven and which functions to transfer articles alternately and successively from different supply conveyers to an intermediate receiving conveyer.

Another object of our invention is to provide an improved lehr loader having fluid actuated means operating at timed intervals for transferring an article from one supply conveyer to a receiving conveyer and another article from another supply conveyer to a different location on said receiving conveyer.

Another object is to provide an improved lehr loader of the character described in the preceding paragraph wherein supply conveyers are arranged at opposite sides of a receiving conveyer, and wherein improved positively actuated means is associated with said conveyers for alternately transferring articles from the supply conveyers onto the receiving conveyer and in positions located at opposite sides of the longitudinal center line of said last named conveyer.

A further object of the invention is to provide an improved lehr loader in accordance with that described in the two immediately preceding paragraphs wherein the supply conveyers and the receiving conveyer are of the endless type travelling at different rates of speed, and wherein positively actuated transfer means is provided for alternately shifting articles from first one and then the other of said supply conveyers onto said receiving conveyer.

The above and other objects and advantages of our invention will appear from the following description and appended claims when considered in connection with the accompanying drawings wherein like reference characters designate corresponding parts in the several views.

In its preferred form, our invention contemplates the provision of a lehr-loading apparatus embodying a continuously moving conveyer disposed in front of the lehr conveyer and moving in the same direction as the lehr conveyer. The continuously moving conveyer of our apparatus is preferably as wide or wider than the lehr conveyer and moves at a much higher rate of speed than the lehr conveyer. The conveyer of our apparatus is adapted to receive the ware preferably in double file from the forming machine.

Before explaining in detail the present invention it is to be understood that the invention is not limited in its application to the details of construction and arrangement of parts illustrated in the accompanying drawings, since the invention is capable of other embodiments and of being practical or carried out in various ways. It is to be understood also that the phraseology or terminology employed herein is for the purpose of description and not of limitation, and it is not intended to limit the invention claimed herein beyond the requirements of the prior art.

Figure 1:
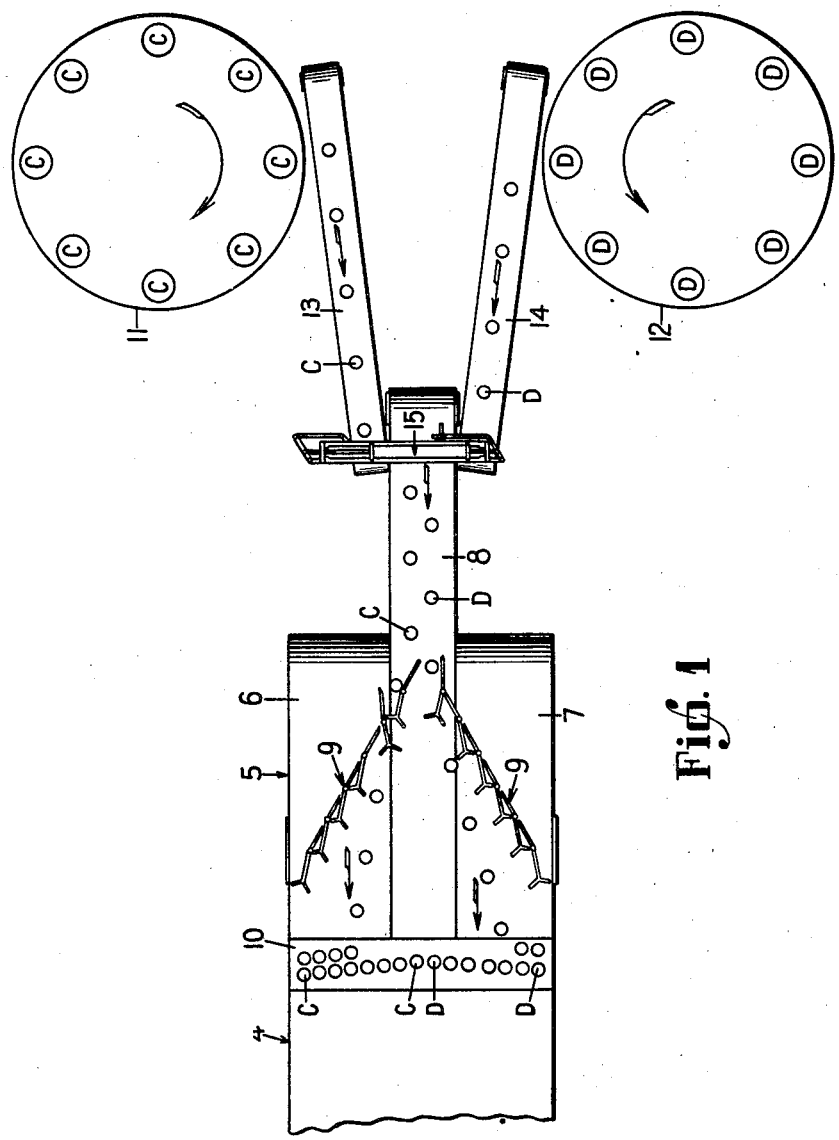
Figure 1 is a somewhat diagrammatic top plan view, illustrating an assembly embodying the invention wherein there is shown a receiving conveyer for receiving articles from conveyers leading from two separate forming machines, together with one improved article transferring or shifting means or apparatus in association with the several conveyers.

Referring now particularly to Figure 1 of the drawings, we have illustrated our lehr-loading apparatus associated with the conveyer 4 of a continuous type lehr (not shown). The conveyer 4 moves continuously at a slow rate of speed. Our apparatus, as shown, is adapted to receive the ware from the two separate forming machines, shown diagrammatically at 11 and 12, Figure 1, and supply it to the lehr conveyer 4 in such a manner that it will be arranged on the lehr conveyer to obtain maximum efficiency of the lehr.

A conveyer unit of the endless belt type and shown as a whole at 5, is suitably mounted with relation to the lehr, as fully described in our copending application above referred to, and is so related to the lehr that the conveyer will extend and move in the same direction as the lehr conveyer 4, said conveyer 5 being preferably disposed just slightly higher than the lehr conveyer 4. As shown, a grille 10 is provided to bridge the space between the conveyers 4 and 5.

The conveyer unit 5, as shown, comprises side conveyer belts 6 and 7 and an intermediate conveyer belt 8. All of these conveyer belts are of the endless type. The upper flight of each of these belts passes over a horizontally disposed plate (not shown) which is supported on the upper end of suitable frame structure and extends for the full width and length of said structure. Thus, the upper flight of the belts 6, 7 and 8 are disposed in the same horizontal plane and the belts are disposed side by side with their adjacent edges, as shown, being close to each other. The belts are preferably made of wire mesh material of the same nature as that usually provided for the lehr conveyer 4. The belt 6 is preferably of the same width as the belt 7 but the intermediate belt 8 is of substantially less width than the outer belts. It is to be noted that the belt 8 extends to the right of the figures beyond belts 6 and 7.

The belts 6, 7 and 8 are driven continuously and simultaneously at the same rate of speed by means of suitable drive mechanism (not shown) which may be similar to that shown in our aforesaid copending application. The speed of movement of the belts 6, 7 and 8 is preferably considerably greater than that of the lehr conveyer belt 4.

The extended portion of the conveyer belt 8, as shown, is adapted to receive the ware from a pair of forming machine conveyers 13 and 14 from forming machine 11 and 12, respectively, see Fig. 1. The belt 8 receives the ware from belts 13 and 14 and the ware will be conveyed by the continuously moving belt 8 to an article-guiding and arranging unit composed of two sections 9 arranged in V formation, see Figure 1. This unit will function to arrange the ware in a plurality of longitudinally extending closely laterally spaced rows of ware on the conveyer belts 6, 7 and 8.

Referring again to Figure 1 of the drawings, we have shown a preferred arrangement which may be provided for receiving different types of articles from two different forming machines. In this figure there is illustrated, diagrammatically, a forming machine 11 which produces articles C and another forming machine 12 which produces articles D. A conveyer 13 receives the articles C from the machine 11 and a similar conveyer 14 receives the articles D from the machine 12. These conveyers 13 and 14, as shown, converge toward each other and overlap the side edges of the outwardly projecting portion or end of conveyer 8. A positively operated unit, shown as a whole at 15, is provided for sliding an article C from the conveyer 13 onto the conveyer 8 and then sliding an article D from conveyer 14 onto the conveyer 8 and repeating this operation in rapid sequence. In other words, the unit 15 alternately moves or shifts the successive articles C and D laterally onto the conveyer 8 from their respective conveyers 13 and 14.

Figure 2:
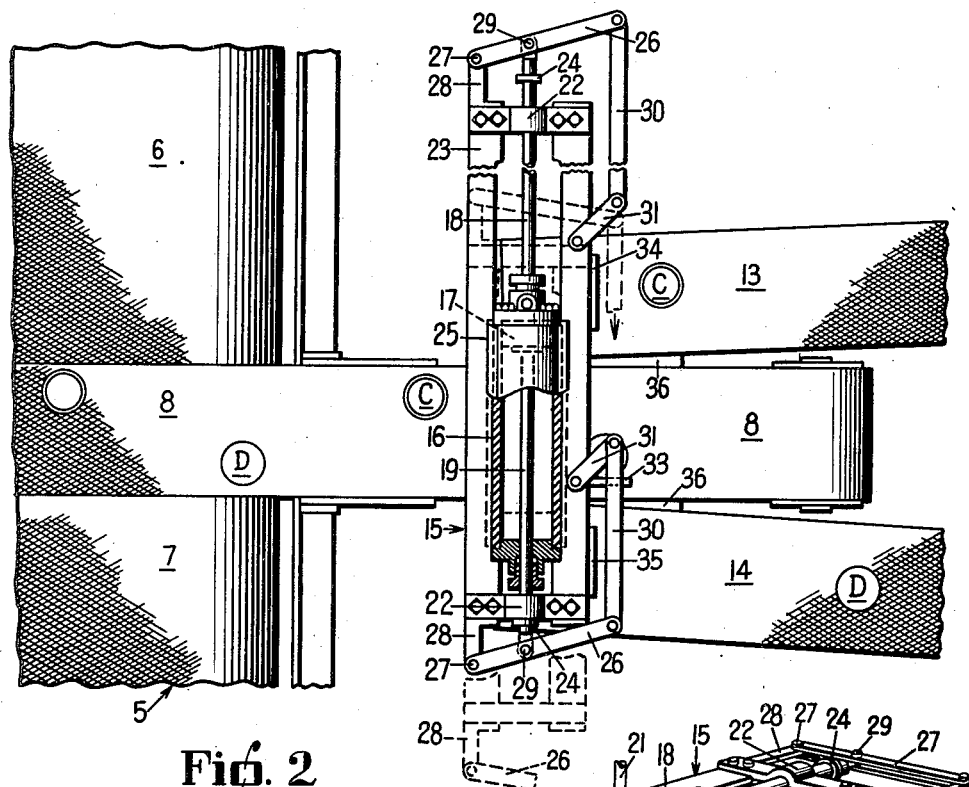
Figure 2 is an enlarged top plan view, partly broken away, showing the article transfer or shifting means or apparatus illustrated generally in Fig. 1.
Figure 3:
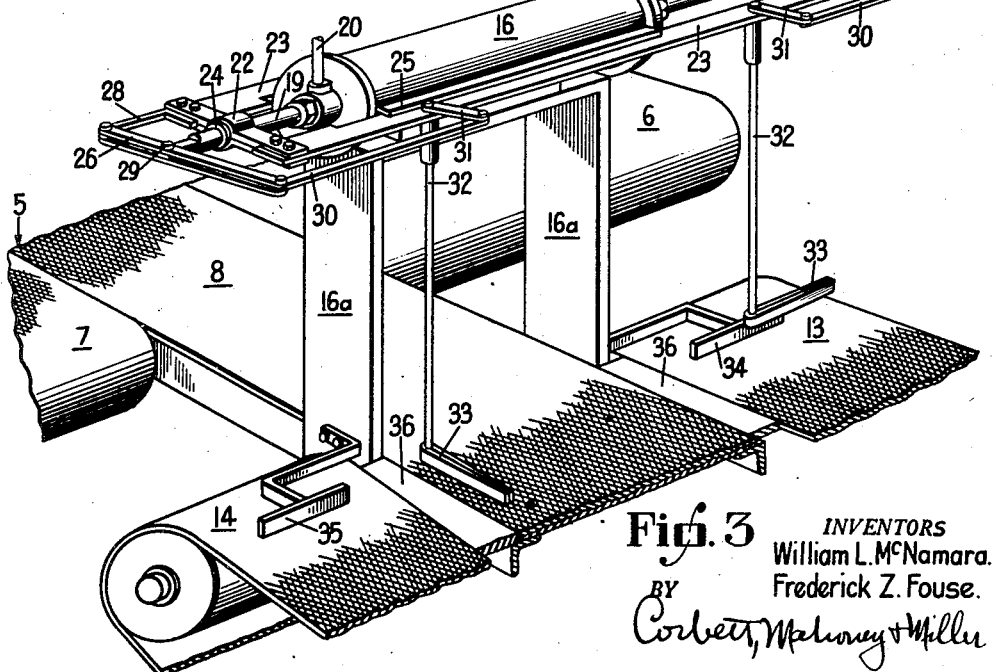
Figure 3 is a perspective view of the apparatus shown in Figure 2.

The unit 15 is shown in detail in Figures 2 and 3. It comprises, as shown, a double action cylinder and piston unit 16. This unit 16 is supported by a frame 16a, the legs of which straddle the conveyer 8. The unit 16 is horizontally disposed and includes a piston 17 reciprocably mounted in the cylinder and having piston rods 18 and 19 projecting outwardly from the opposite ends thereof. The piston 17 is first moved in one direction and then in the opposite direction by air supplied to the cylinder and exhausted therefrom through the medium of the lines 20 and 21 which are connected to opposite ends of the cylinder. The air flow to and from the cylinder 16 may be controlled by the usual type of timing mechanism (not shown) which may be provided on forming machine 11 or 12 or by the timing mechanism (not shown) usually provided for the glass feeder (not shown).

The outer portions of the piston rods 18 and 19 are, as shown, supported for axial movement in strap-like guide or bearing members 22 carried by opposite outer ends of frame 23. Each of the rods 18 and 19 is provided with a stop member or portion 24 adjacent its outer end which will engage the member or portion 22 and limit inward axial movement of the rod relative to the frame 23. The frame 23 is mounted for reciprocation in guides 25 formed on the unit 16. Each end of the frame 23 carries a lever 26 which is fulcrumed, as at 27, to a bracket 28 secured to the frame. The levers 26 are pivoted to the ends of the rod 18 and 19, as at 29. The opposite ends of the levers are pivoted to links 30. Each of the links 30 is pivoted to the outer end of an arm 31. The arms 31 are plied onto the upper ends of rods 32 which are spaced apart. The rods 32 are vertically disposed and each of them has an article-engaging arm, member, or foot 33 keyed on its lower end. These arms 33 will be supported at a point slightly above the conveyer 8.

In the operation of the unit 15, assuming that the parts thereof are in the condition and positions shown in Figures 2 and 3, an article C will be carried by the conveyer 13 into association with a stop 34 secured to the support or frame member 16a adjacent the path of movement of the member 33 disposed above the conveyer 13. At this time the member 13 will be in its outermost position and will be positioned substantially at right angles to the path of movement of conveyer 13, as seen at the right of Figure 3. The member 33 will have been swung to this position because the piston rod 18 has been moved to its outermost position and has swung the lever 26, to which it is connected, outwardly, or to the right of Fig. 3, about pivot 27. Air is then supplied to the cylinder 16 to move the piston 17 therein to the opposite end of the cylinder. This movement of the piston will pull the piston rod 18 into the cylinder and push the rod 19 out of the cylinder. The rod 18 will move axially relative to the frame 23 until the stop member 24 on said rod contacts the member 22 on the frame. This relative movement of the rod and frame swings the arm 33 around to a position substantially at right angles to its original position. Further movement of rod 18 causes the frame 23 to move, carrying the arm 33 along with it. The arm 33 engages the article C and slides it from the conveyer 13 onto the conveyer 8 at one side thereof. Outward movement of rod 19 causes it to move relative to frame 23 and swings the lever 26, connected thereto, outwardly. This swings the member 33, adjacent conveyer 14, into a position substantially at right angles to the path of movement of conveyer 14 and the movement of frame 23 will move this member 33 to a point adjacent the outer edge of conveyer 14. A stop member 35, like stop member 34, is associated with the conveyer 14. Thus, this member 33 will be in position to be brought into engagement with an article D moved into contact with stop 35.

It will be apparent that with this arrangement, one of the members 33 will engage an article on one conveyer and slide it onto the conveyer 8 while the other member 33 is simultaneously moved into such a position that it will be ready to engage an article on the other conveyer. In the return movement of each of the members 33, such member will be disposed substantially at right angles to the path of movement of the article-supplying conveyer and will not interfere with an article moving into association with the stop provided therefor.

It will be apparent that with this arrangement the articles C and D, coming from the two separate forming machines, 11 and 12, will be kept separate from each other. These articles will be carried by the conveyer D to the article-guiding and arranging units 9 shown in Figure 1. Small tapered plates 36 may be provided between the conveyers 13 and 14 for bridging the gaps therebetween, see Figure 3.

Having thus described our invention, what we claim is:

1. Apparatus of the type described including a continuously moving conveyer, means for supplying articles in two rows to said conveyer, said means comprising a pair of article-supplying conveyers disposed at opposite sides of said first-named conveyer, means for pushing an article first from one of said supplying conveyers to the first conveyer and then pushing an article from the other of said supplying conveyers to the first conveyer in such a manner that the articles will be disposed in two rows on the first conveyer, said means comprising a reciprocable support disposed above said first conveyer, said support carrying an article-engaging member at each end thereof adapted to move over the article-supplying conveyer at the corresponding side thereof and to engage an article and to push it off the supplying conveyer onto the first conveyer, and means for swinging each of said article-engaging members from article-engaging position, extending longitudinally of the conveyer, to inoperative position, extending transversely of the conveyer, during the reciprocation of said support.

2. In combination with article-guiding and arranging means for guiding and arranging articles to be introduced into a lehr in which said means is located above and in close proximity to a plurality of article-receiving movable conveyers and in which one of said article-receiving conveyers has a forward extension beyond the forward ends of the other conveyers; of means for supplying articles in two rows to said conveyer extension, said means comprising a pair of article-supplying conveyers disposed at opposite sides of the conveyer extension, and fluid actuated article-transfer means movable relatively to the article-supplying conveyers and said extension for first transferring an article from one of said article-supplying conveyers onto said extension and then from the other of said article-supplying conveyers onto the extension, said fluid-actuated article-transfer means including periodically oscillatable article-engaging and shifting members for alternately transferring articles from the article-supplying conveyers onto the forward extension of one of the article-receiving conveyers.

WILLIAM L. McNAMARA.
FREDERICK Z. FOUSE.